UNITED STATES PATENT OFFICE.

CLAUS NISSEN RIIBER, OF TRONDHJEM, NORWAY, ASSIGNOR TO NORSK ALKALI A/S., OF TRONDHJEM, NORWAY.

PROCESS FOR THE PURIFICATION OF ALKALI-METAL-CHLORID SOLUTIONS.

1,308,509.     Specification of Letters Patent.     Patented July 1, 1919.

No Drawing.     Application filed December 12, 1918. Serial No. 266,518.

*To all whom it may concern:*

Be it known that I, CLAUS NISSEN RIIBER, of Hans Hagerups Gate 8, Trondhjem, in the Kingdom of Norway, have invented certain new and useful Improvements in Processes for the Purification of Alkali-Metal-Chlorid Solutions; and I do hereby declare the following to be a full, clear, and exact description of the invention, such as will enable others skilled in the art to which it appertains to make and use the same.

In electrolyzers working with solutions of alkali metal chlorids and more particularly in such electrolyzers in which the anolyte passes transversely through the diaphragm into the cathode chamber, it is of special importance, that the said salt solution be quite free from traces of impurities, substantially consisting of the compounds of the alkaline earth metals and of the earth metals. Otherwise the pores of the diaphragm are gradually filled and the circulation of the electrolyzer liquid choked up with precipitated hydroxids, carbonates and sulfates and in addition thereto formation of foam is liable to take place during the electrolysis.

It is usual to purify such salt solutions by the addition of sodium carbonate, but the last traces of impurities are not thereby removed.

Other manufacturers employ caustic soda lye as a precipitation agent, which effects a still more incomplete removal of all impurities, considerable quantities of the alkaline earth metal compounds being retained in an unprecipitated condition as hydroxids of a low solubility, which are subsequently separated during the electrolysis in the form of carbonates by the carbon dioxid produced by the oxidation of the carbon electrodes.

The applicant has now discovered on the one hand that no matter how the purification or precipitation is effected, it is necessary to filter the salt solution in a hot condition. The fact is, that in such solutions substances, such as basic carbonate of magnesium, are present, which are of a lower solubility at higher than at lower temperatures. When the solution, filtered in a cold condition as is at present usual, is introduced into the electrolyzer, in which a temperature of about 60–80° C. prevails, substances will be precipitated which choke up the fine pores of the diaphragm and after some time also the pipes and other parts.

It is of advantage therefore to filter the liquid at the same or a higher temperature than that of the electrolyzer, or more exactly expressed that of the diaphragm and anode chamber.

It has also been discovered that the most complete purification is obtained by not using the normal carbonate for the precipitation but by subjecting the solution to an excess of carbonic acid and then boiling the solution, carbonates being thereby precipitated, while free carbon dioxid escapes.

The precipitation may suitably be carried into effect by adding caustic alkali lye (for instance electrolyzed salt solution) or alkali metal carbonate until the reaction is alkaline, whereupon most of the precipitate is allowed to settle, and then filtering the liquid, treating it with carbon dioxid or gases bearing carbon dioxid, for instance limestone-burner-gases or combustion gases, boiling the solution and filtering it in a hot condition.

Instead of treating the liquid with gases bearing carbon-dioxid, alkali metal bicarbonates may of course be added.

The heating of the salt solution requiring considerable heat, it is of advantage to preheat the salt solution which flows into the boiling vessel by means of the hot filtered solution flowing from this same vessel. By this means also the definitely purified salt solution attains the temperature suitable for the electrolysis.

I claim:

1. In the process of electrolyzing alkali metal chlorid solutions, the step which consists in filtering the solution to be electrolyzed at a temperature not less than that of the electrolyzer.

2. In the process of electrolyzing alkali metal chlorid solutions, the steps which consist in adding a precipitating agent to the solution to be electrolyzed and filtering at a temperature not less than that the electrolyzer.

3. In the process of electrolyzing alkali metal chlorid solutions, the steps which consists in rendering the solution to be electrolyzed alkaline, introducing carbon dioxid in excess into the alkaline solution, heating the solution to boiling to effect precipitation of normal carbonates, while the excess of carbon dioxid escapes, and filtering at a temperature not less than that of the electrolyzer.

4. In the process of electrolyzing alkali metal chlorid solutions, the steps which consists in filtering the solution to be electrolyzed at a temperature not less than that of the electrolyzer and preheating the solution to be filtered by means of the hot filtered solution.

5. In the process of electrolyzing alkali metal chlorid solutions, the steps which consist in adding a precipitating agent to the solution to be electrolyzed, filtering at a temperature not less than that of the electrolyzer and preheating the solution to be filtered by means of the hot filtered solution.

In testimony that I claim the foregoing as my invention, I have signed my name in presence of two subscribing witnesses.

CLAUS NISSEN RIIBER.

Witnesses:
J. H. OLAF,
T. NELLY.